United States Patent
Tourn et al.

(10) Patent No.: US 11,071,299 B2
(45) Date of Patent: Jul. 27, 2021

(54) MITICIDE COMPOSITION OF PROLONGED ACTION AND ITS MANUFACTURING PROCESS, A MITICIDE STRIP AND A PROCEDURE TO CONTROL VARROA DESTRUCTOR MITE

(71) Applicant: Coop. de Trabajo Apicola Pampero Ltda., Bahia Blanca (AR)

(72) Inventors: Elian Tourn, Bahia Blanca (AR); Danilo Rubenacker, Bahia Blanca (AR); Diego Iaconis, Bahia Blanca (AR); Gabriel Gomez, Bahia Blanca (AR); Luciano Marcelo Morales Pontet, Bahia Blanca (AR); Alfredo Marconi, Bahia Blanca (AR); Evangelina Mirta Torres, Bahia Blanca (AR)

(73) Assignee: Coop, de Trabajo Apicola Pampero Ltda., Bahia Blanca (AR)

( * ) Notice: Subject to any disclaimer, the term of this patent is extended or adjusted under 35 U.S.C. 154(b) by 0 days.

(21) Appl. No.: 15/111,587

(22) PCT Filed: Apr. 22, 2014

(86) PCT No.: PCT/ES2014/070346
§ 371 (c)(1),
(2) Date: Jul. 14, 2016

(87) PCT Pub. No.: WO2015/107233
PCT Pub. Date: Jul. 23, 2015

(65) Prior Publication Data
US 2017/0042147 A1    Feb. 16, 2017

(30) Foreign Application Priority Data
Jan. 14, 2014  (AR) ............................ P20140100124

(51) Int. Cl.
*A01N 37/04* (2006.01)
*A01N 37/02* (2006.01)
*A01K 51/00* (2006.01)
*A01N 37/36* (2006.01)
*A01N 25/10* (2006.01)
*A01N 25/22* (2006.01)

(52) U.S. Cl.
CPC .............. *A01N 37/04* (2013.01); *A01K 51/00* (2013.01); *A01N 25/10* (2013.01); *A01N 25/22* (2013.01); *A01N 37/02* (2013.01); *A01N 37/36* (2013.01)

(58) Field of Classification Search
CPC ........ A01N 37/02; A01N 37/36; A01N 27/00; A01N 25/10; A01N 25/22; A01N 25/34; A01N 37/04; A01K 51/00
See application file for complete search history.

(56) References Cited

U.S. PATENT DOCUMENTS

| | | | | |
|---|---|---|---|---|
| 2006/0008492 A1* | 1/2006 | Janowicz | ............. | A01N 25/006 424/405 |
| 2008/0026673 A1* | 1/2008 | Probasco | ............... | A01K 51/00 449/2 |
| 2012/0171268 A1* | 7/2012 | VanderDussen | ....... | A01N 37/02 424/405 |

FOREIGN PATENT DOCUMENTS

WO    2010064013 A2    10/2010

OTHER PUBLICATIONS

Gregorg, A. & Planinc, I. "The Control of Varroa destructor Using Oxalic Acid". The Veterinary Journal 2002, vol. 163, pp. 306-310.
Mahmood, R. et al. "Control of Varroa destructor using oxalic acid, formic acid and Bayvarol strip in Apis mellifera (Hymenoptera: Apidae) Colonies". Pakistan Journal of Zoology 2012, vol. 44, No. 6, pp. 1473-1477.
Ebert, T.A. et al. "Oral toxicity of essential oils and organic acids fed to honey bees (*Apis mellifera*)" Journal of Apicultural Research and Bee World 2007, vol. 46, No. 4, pp. 220-224.
Mato, I. et al. "Significance of Nonaromatic Organic Acids in Honey". Journal of Food Protection 2003, vol. 66, No. 12, pp. 2371-2376.
Giovenazzo, P. & Dubreuil, P. "Evaluation of spring organic treatments against Varroa destructor (Acari: Varroidea) in honey bee *Apis mellifera* (Hymenoptera: Apidae) colonies in eastern Canada". Experimental and Applied Acarology 2011, vol. 55, pp. 65-76.
Patent Certificate issued for corresponding Russian patent No. 2657022 dated Jun. 8, 2018.
Notice of Acceptance dated Jul. 31, 2018 for corresponding Ukrainian patent application No. 2016 08575.

* cited by examiner

*Primary Examiner* — Johann R Richter
*Assistant Examiner* — Danielle Sullivan
(74) *Attorney, Agent, or Firm* — Silvia Salvadori

(57) ABSTRACT

Miticide composition of prolonged action against *Varroa destructor* of bees comprising oxalic acid, glycerin, 4-carbon dicarboxylic acid and formic acid and its manufacturing process. A cellulose trip impregnated in said miticide composition, which is introduced in the bee hives and its manufacturing processes.

6 Claims, 2 Drawing Sheets

MITICIDE COMPOSITION OF PROLONGED ACTION AND ITS MANUFACTURING PROCESS, A MITICIDE STRIP AND A PROCEDURE TO CONTROL VARROA DESTRUCTOR MITE

FIELD OF THE INVENTION

The present invention belongs to the field of the miticides used for pest control and treatment in bee hives. In particular, it is restricted to organic compositions and their form of application.

The invention also proposes a manufacturing process of a miticide composition, a miticide strip and a procedure to control *Varroa destructor* mite using said miticide strip.

STATE OF THE ART

Varroasis in honey bees, *Apis mellifera* L., constitutes an external parasitosis caused by *Varroa destructor* mite, as reported by researchers Laura G. Espinosa Montaño and Ernesto Guzmán Novoa on the efficacy of two natural miticides, formic acid and thymol, to control *Varroa destructor* mites in honey bees (*Apis mellifera* L.) in Villa Guerrero, Mexico State, Mexico (Veterinaria México, vol. 38, number 1, January-March, 2007, pp. 9-19). Varroasis is the most serious problem faced by beekeepers all over the world. *Varroa* affects adult bees as well as their brood. Productivity is affected when infestation exceeds 10% of adult bees in a colony. When infestation reaches 30% to 40%, consequences are devastating. Consequences are low weight and shorter life span, leading to a decrease in honey production of up to 60%.

In order to control said mite numerous efforts have been made. Some of them focused on the use of synthetic miticides but it has been observed that mites develop resistance against them; they are toxic to bees and people and leave chemical residues on honey and wax.

Obtaining bees genetically resistant to this mite is foreseen, but such technology is still at the stage of a project.

The use of certain natural miticides such as formic acid and thymol essential oil, is known for showing low toxicity and low environmental impact, for not leaving residues in honey or wax, or because their residues break down/degrade or volatilize in a short time.

Using chemicals indiscriminately poses two potential risks: the development of mite resistance to the active principle used and the detection of miticide residues in bee hive products. The reproductive features and the high reproductive rate of this mite are factors that make setting control strategies increasingly complex. Since their appearance and for a long time Coumaphos has been one of the most efficient molecules to control varroasis. Unfortunately, badly formulated treatments due to the flaws in the system of pharmaceutical surveillance at the manufacturing laboratories, the indiscriminate and/or non professional use of this active principle have caused the mite resistance development over a vast area of the national territory.

The same situation occurs regarding amitraz, another active principle used, since the Laboratorio de Artrópodos (Atrópodos Laboratory) at the Universidad Nacional de Mar del Plata (National University of Mar del Plata) has determined the first hints of resistance sites on different locations of the country. Flumethrin, a pyrethroid, is the only synthetic active principle which may remain effective for some more seasons. According to what was shown by its pyrethroid predecesor (fluvalinate), the appearance of resistance is likely to occur in a short term. On the other hand, the existing organic treatments on the market have low efficacy in bee hives with brood cycles and numerous constraints according to the geographical region. Therefore, Argentinian beekeepers producers are seriously affected since without an efficient treatment of this parasitosis, they may hardly keep their bee hives productive and even alive over large regions around the country.

The most important countries with beekeeping production are seriously concerned since no multinational company has been able to provide them with a final solution to this parasitosis.

The increased tolerance to the main pyrethroid and organophosphorus miticides used, as well as the appearance of residues of these molecules or their metabolites in the various bee hive products has determined the need for new miticides which may be used within an integral program aimed at the control of this parasitic disease.

Several attempts have been made to solve these problems, such as the one described in patent application n° US2012171268, related to a dispenser filled with a gel comprising a C1 to C10 carboxylic acid and a gelling agent. Said gel is encased by a polyester membrane. This application describes the preparation of an acid-based gel (preferably formic acid) which is introduced in a biodegradable polyester pouch for further gellification and may use glycerol as antifreezing agent. Besides, sugar dissolved in water is added in the preparation of the gel so as to promote the corrosion of the container and allow the release of formic acid. Said dispenser permeates the formic acid vapor, affecting the mite but also killing bees.

The use of oxalic acid in an aqueous medium is known to be laborious and inefficient, in addition to its low efficiency in the presence of brood and the impossibility to be used in cold periods (Eguaras—Ruffinengo Estrategias Para el control de *Varroa*/Strategies to control *Varroa*—Pp. 70 to 77) http://www.laboratoriobaldan.com/esp/ensayos/eficacia_ab_var_bio.pdf In the same sense, it has been known for some time that essential oils, especially thymol, have efficient effects against Varroasis. Similarly, certain organic acids such as lactic and formic acid can be mentioned, but it is also known that applying them is difficult, there may be risks if misused and they are expensive and demand additional work for the beekeeper.

The prolonged action miticide composition of the present invention allows the effective control of Varroasis in *Apis mellifera* hives in a simple manner, solving the problem of using chemical compounds and acid or organic substances in aqueous solutions which have side effects on bee populations.

BRIEF DESCRIPTION OF THE INVENTION

Figure 1:
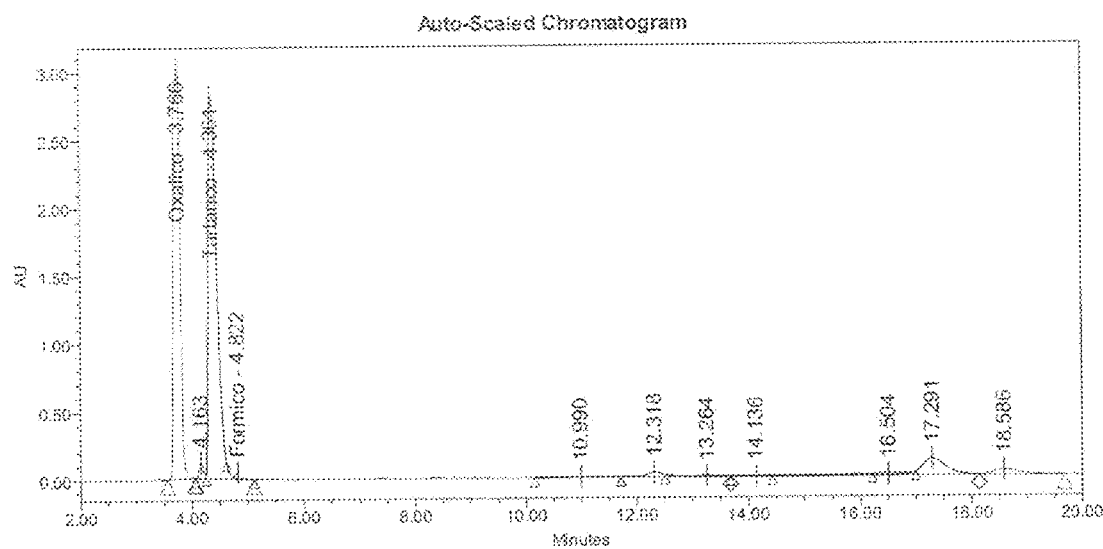
FIG. 1: It corresponds to the chromatogram of the composition of the invention according to Example 1, where the concentration of oxalic acid is 146 mg/g; tartaric acid is 714 mg/g and formic acid is 14 mg/g. Analysis was performed applying the official method AOAC 986.13 (2000), applying internal standards and with a DAD (215 nm).

The miticide composition of prolonged action of the present invention which controls Varroasis in *Apis mellifera* colonies comprises oxalic acid, glycerin, formic acid and 4-carbon dicarboxylic acid, preferably tartaric acid or 2-hydroxy butanedioic acid, more preferably tartaric acid. This composition is preferably free from added polymers and water. Also, it is free from crystals for a period of at least 2 years kept at temperatures of between 0° C. and 40° C. The preferred concentrations for said components are: glycerin between 0 and 20% (P/P); oxalic acid between 5 and 20% (PIP), formic acid between 0.5 and 15% (P/P) and 4-carbon dicarboxylic acid between 50 and 80% (P/P). More preferably: glycerin between 0 and 20% (P/P); oxalic acid between 8 and 15% (P/P), formic acid between 2 and 15% (V/V) and 4-carbon dicarboxylic acid between 65 and 75% (P/P). Also, said composition of the invention comprises a density between 1 and 1.5 g/cm3.

Another object of the present invention is a cellulose miticide strip comprising said miticide composition of the present invention impregnated in said strip. Where said strip comprises a size of between 5 and 100 mm width and 0.5 and 5 mm thickness; and it is free from crystals and coating polymers.

Said strip of the present invention is applied in a dose for the bee hive of between 1 and 10 each bee hive and comprises an efficacy higher than 90% killing *Varroa destructor* mite due to the mere effects of the contact of said strip with bees even in hives with a great brood development, interrupting the cycle with only one application. Preferably, said efficacy is higher than 95%, more preferably higher than 97%. Moreover, said strip of the present invention comprises a stable effect against *Varroa destructor* mite of at least 40 days, more preferably of at least 2 years under temperatures between 0° and 40° C.

Another object of the present invention is the manufacturing process of the miticide composition of the present invention, comprising the following steps:
 a. mixing glycerin and oxalic acid,
 b. heating the mixture,
 c. cooling the mixture.

In particular, to obtain the miticide composition of the invention it is proposed according to said step a. mixing glycerol and oxalic acid at a rate between 3:1 and 1:3 and heating the mixture according to said step b. up to a temperature ranging from 90° C. to 150° C. during a period of time between 1 and 5000 seconds.

In a specially preferred embodiment in step a. of said process, glycerin comprises a concentration of between 5 and 95% (V/V) preferably between 50 and 75% and the oxalic acid comprises a concentration of between 5 and 95% (V/V), preferably of between 25 and 50% (V/V). And at step b. it comprises heating up to a temperature ranging from 60 C.° to 150° C., preferably from 90 C.° to 120° C., over a time of between 1 and 5000 seconds, preferably of between 1 and 600 seconds. More preferably said step b. comprises heating up to a temperature ranging from 100° C. to 120° C. during a period of time between 1 and 120 seconds.

In a preferred embodiment of the invention said manufacturing process of the miticide composition of the present invention in said step b. comprises a continuous process and heating by means of a continuous flow heat exchanger up to a temperature ranging from 100° C. to 130° C. during a period of time between 1 and 60 seconds.

Another object of the present invention is a process to manufacture the miticide strip of the present invention comprising dipping said cellulose strip in said miticide composition between 30° C. and 120° C. during a period of time ranging from 1 minute to 96 hours.

Another object of the present invention is the procedure to control *Varroa destructor* mite comprising introducing a quantity of between 1 and 10 miticide strips of the present invention in a bee hive. And said procedure to control *Varroa destructor* mite comprises a killing efficacy for *Varroa destructor* mite of at least 90%, preferably at least 95%, more preferably at least 97%.

DETAILED DESCRIPTION OF THE INVENTION

The term "miticide" is hereby equivalent to "acaricide".

The miticide composition of prolonged action of the present invention, manufactured from oxalic acid and glycerin, by applying heat to the mixture, results in a highly efficient miticide for the control of *Varroa destructor* mite, a pest which is typical of bees (*Apis mellifera*). The strips of a suitable porous material, such as cellulose, impregnated in the composition of the invention, result in a veterinary product which is introduced in hives.

The terms "prolonged action" refer to the fact that the miticide composition of the present invention retains its miticide properties for at least 40 days, more than two reproductive periods of *Varroa destructor*; even when strips of the present invention have been used for over two years from manufacturing date, and their miticide properties remain intact.

The organic composition of the present invention shows a number of advantages faced with the alternatives offered by the state of the art, such as:
 It does not originate synthetic residues.
 Its use does not develop resistance in the short or medium-term by the infestations it treats.
 It is capable of acting along successive cycles of infestations without the need to be applied again.
 It has a low production cost, which implies a lower economic impact in farming activities.
 It is easily applied on Langstroth bee hives.
 Applied on *Apis mellifera* colonies, it is an effective product for the elimination of *Varroa* spp mites.
 It does not have proved harmful effects on *Apis mellifera* colonies.
 It is capable of remaining effective over more than 42 days, requiring only one application, interrupting the Varroasis cycle and resulting in efficacy higher than all existing formulations of organic origin.

The present invention is a good agent for mite control, in autumn as well as in spring, when oviposition is high and a minimum of 20 days is needed to interrupt the cycle. The composition of the invention does not require bees to consume it, which constitutes one of the advantages of the treatment, thus avoiding bee intoxication. On the other hand, the present invention allows a non-contaminant treatment; therefore it may be used all the year round, even during harvest without leaving contaminant residues in bee hive products. Finally, this invention may be used for decades since the development of resistance is practically improbable due to its organic nature. For all the stated above, the present invention is an excellent solution to the problem of mite control among bee populations, and extremely useful for beekeepers of the region, Argentina and the world.

Oxalic acid is an organic chemical compound found in nature in fruits, some plants and even—in small quantities, in honey. This means that using it against *Varroa* and because it is degradable, it does not contaminate honey. This also happens with tartaric acid, which is widely used in food products.

Oxalic acid has been widely used in Europe, mainly in countries such as Switzerland, France and Germany, showing an excellent efficacy against *Varroa* in bee hives without brood. Up to the moment, two forms of application are used: spraying or syrup or mixture of water and sugar. In both cases, the composition is applied 3 times, every 7 days.

These application forms only allow an efficacy over 50% in the absence of brood in the bee hive or during cold periods. This phenomenon comprises analyzing the life cycle of *Varroa*, which has a total duration of 16 days out of which 12 is the period when it reproduces within operculated brood cells and the remaining days in phoretic state, i.e., on adult bees.

In the traditional form of application, spraying over honeycomb boxes, some hours after the operation the ventilation and the own temperature of the colony cause the solution drops to dehydrate, oxalic acid crystalizes and loses its acidic power.

The composition of the present invention impregnated in a certain quantity of cellulose, which may be hydromethyil cellulose, hydroxyethyl cellulose, hydroxypropylcellulose, paper, cardboard, etc., which shall be hereby called cellulose strips, and applied on colonies of a large surface with brood, in a dose ranging from 1 to 10 strips per bee hive control *Varroa destructor* in said bee hives, with an efficacy higher than 90%, even higher than 97%.

The following examples show details of the composition, the miticide strips of the invention, as well as the process to manufacture the invention, to be used for mite control. Such examples are not intended to restrict the protection scope of the claims, but they provide all the necessary information for any technician in the field of the matter to reproduce it.

EXAMPLES OF APPLICATION

Example 1

Manufacturing the Prolonged Action Miticide Composition Against *Varroa destructor* of the Present Invention by Means of Direct Heating.

5 kg of oxalic acid and 5 kg of glycerin were placed in a container on heat and the solution was stirred until it reached a temperature of 100, and kept for 40 minutes.

The solution mentioned above was cooled naturally by removing the heat source until a temperature lower than 40° C. was reached. It was subsequently fractioned into 1600 grams in pouches of 300 microns.

Thus the composition of the present invention was obtained, the chromatogram of which can be seen in FIG. 1, where the concentration of oxalic acid is 146 mg/g; of tartaric acid is 714 meg and of formic acid is 14 mg/g.

As regards techniques, analysis was performed applying the official method AOAC 986.13 (2000), according to internal standards and with a DAD (215 nm).

Example 2

Manufacturing the Prolonged Action Miticide Composition Against *Varroa destructor* of the Present Invention by Means of Continuous Heating 5 kg of oxalic acid and 5 kg of glycerin were mixed in a PVC tank, and it was stirred until a uniform mixture was obtained. This mixture was pumped into a heat exchanger whose exchange liquid is an oil at a temperature of 117° C. Residence time in said exchanger was 24 minutes.

The solution leaving said exchanger enters a cooler which takes said solution to a temperature lower than 40° C., thus obtaining the composition of the present invention which was fractioned into 1600 grams in pouches of 300 microns.

Figure 2:
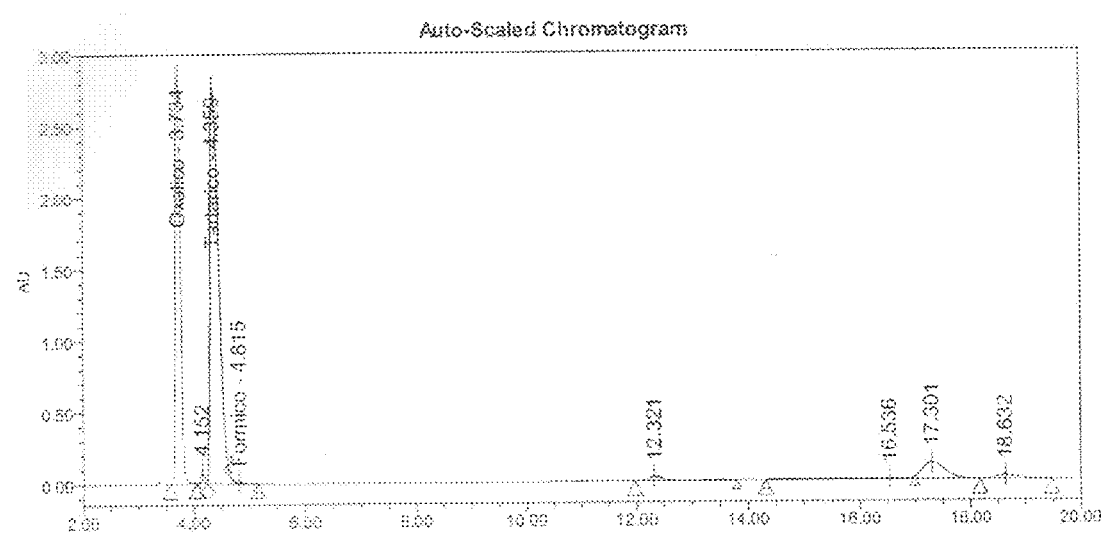
FIG. 2: It corresponds to the chromatogram of the composition of the invention according to Example 2, where the concentration of oxalic acid is 90 mg/g; tartaric acid is 686 mg/g and formic acid is 5 mg/g. Analysis was performed applying the official method AOAC 986.13 (2000), applying internal standards and with a DAD (215 nm).
Figure 3:
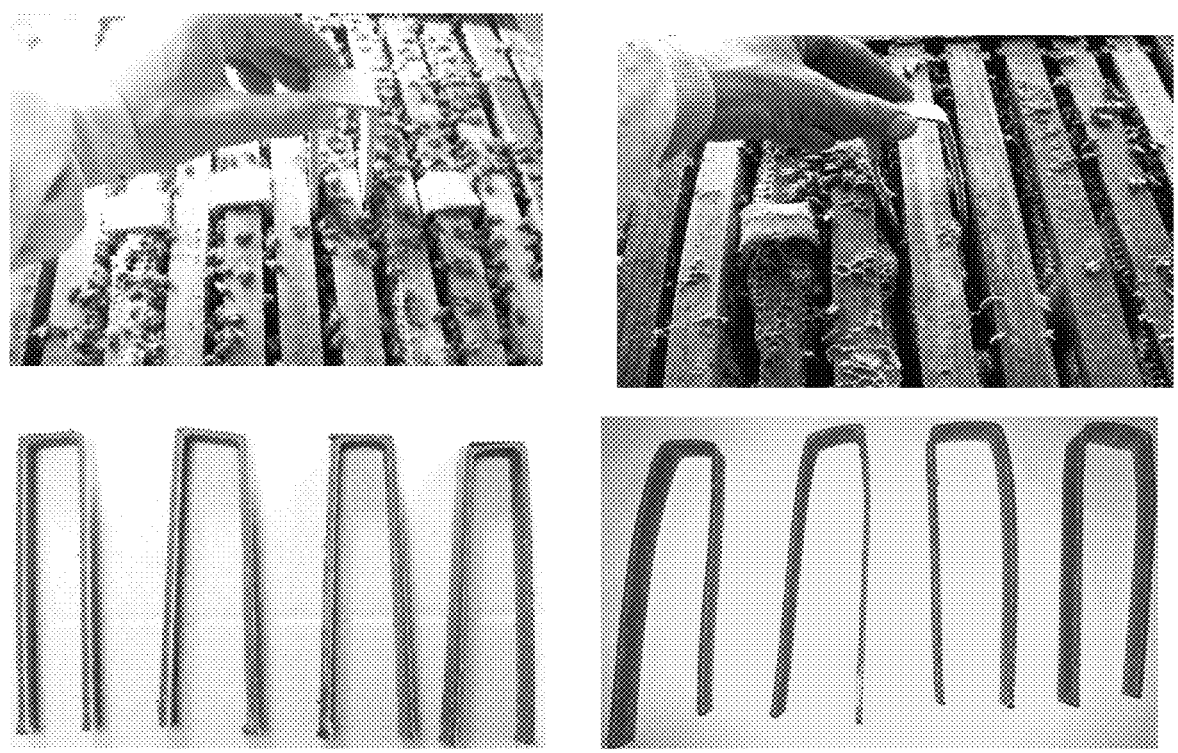
FIG. 3: Miticide strips of the present invention can be seen placed in the bee hive and before placement.

Therefore, the composition of the present invention was obtained, the chromatogram of which can be seen in FIG. 2, where the concentration of oxalic acid is 90 mg/g; of tartaric acid is 686 mg/g and of formic acid is 5 mg/g. As regards techniques, analysis was performed applying the official method AOAC 986.13 (2000), accordint to internal standards and with a DAD (215 nm).

Example 3

Manufacturing the Prolonged Action Miticide Composition Against *Varroa destructor* of the Present Invention by Means of Continuous Heating at Industrial Scale.

The process starts at 2 vertical hoppers where the raw material: glycerin and oxalic acid, are stored. Due to the high viscosity of the raw material at low temperature and so as to ensure a minimum degree of fluidity towards the production line, a suitable heating degree is provided, by means of a lower power electric-tracing.

Components preferably in a 1:1 ratio are loaded into the mixer from the bottom of the hopper by means of a couple of pumps, in proportions previously stated according to different doses, applications and/or field treatment. Viscosity is kept at acceptable values, as the step prior to the start of the pumping process, by continuous removal of the preparation and always under controlled temperature by heating (circulating hot water through the jacket of the mixer).

An impeller pump is fed from a mixing unit, thus establishing a continuous flow of the preparation being processed through a heat exchanger. At the exchanger outlet, the mixture reaches a temperature of the order of 120° C. The heating fluid in the jacket is thermal oil, which allows operation at heating temperatures of about 170° C., keeping the circuit pressure at atmospheric value. Residence time has been adjusted by 30 seconds.

After the heating stage, the product undergoes accelerated cooling by means of an exchanger which is conceived in a similar manner to the previos one, which uses well water or a cooling tower to lower the product temperature to around 40° C., to be poured in an intermediate storage tank operating as a buffer between heating-cooling stages and the final dosing-filling stage.

The miticide composition of the present manufactured invention is kept in the buffer tank at an approximate temperature of 40° C., by continuous heating with hot water circulating through the tank jacket. Simultaneously, a slight removal by means of a mechanical stirrer allows ensuring the right degree of homogeneity.

The tablet, wafer or board filling device is fed from the buffer tank by controlled pumping. Such tablets, wafers or boards are meant for the final distribution of the manufactured miticide of the present invention in the bee hives.

Example 4

Manufacturing the Miticide Strips of the Invention

The miticide composition of prolonged action of the present invention against *Varroa destructor* obtained in Example 1, already fractionated into 1600 grams placed into 300 micron pouches, impreganates 32 cellulose strips, 30 mm wide and 3 mm thick which are immersed in said pouches. Said pouches containing cellulose strips and said composition were allowed to rest for 24 hours without closing them, to be subsequently sealed. Thus, packages of 32 miticide strips of the present invention were obtained.

Example 5

Evaluation Experiences on the Efficacy of the Present Invention.

Different miticide strips of the invention were manufactured varying the process conditions to evaluate the miticide efficacy against *Varroa destructor* starting from the compositions of the present invention according to Examples 1, 2 and 3 and its incorporation to cellulose strips according to Example 4.

Different miticide formulations were evaluated on the basis of processing oxalic acid and glycerin according to Examples 1 and 2 in cellulose strips as in Example 4, in the months of April, May and June at an apiary at Cabaña Cristal located in General Daniel Cerri (Province of Buenos Aires), with two different heating methods to be applied to the solution: according to a) heat exchanger (as shown in Example 2); and b) direct heat transmission (as shown in Example 1).

The resulting solutions were cooled until a temperature lower than 40° C. was reached, and subsequently fractionated into 2500 grams in pouches of 300 microns, containing 100 or 50 cellulose strips depending on being 1.5 mm or 3 mm thick. Packages with the cellulose strips and the solution were placed without sealing/closure, open. After 24 hours packages were finally sealed.

TABLE 1

Treatments evaluated.

| Treatment | Heating | Temperature reached (° C.) | Heating time (minutes) | Cellulose Thickness (mm) |
|---|---|---|---|---|
| Oxa 9 (T1) | Heat Exchanger | 109 | 8.3 | 3 |
| Oxa 10 (T1) | | 109 | 8.3 | 1.5 |
| Oxa 11 (T2) | | 117 | 27 | 3 |
| Oxa 12 (T2) | | 117 | 27 | 1.5 |
| Oxa 13 (T3) | | 124 | 34 | 3 |
| Oxa 14 (T3) | | 124 | 34 | 1.5 |
| Oxa 15 (T4) | Direct heat transmission | 100 | 40 | 3 |
| Oxa 16 (T4) | | 100 | 40 | 1.5 |
| Oxa 17 (T5) | | 109 | 60 | 3 |
| Oxa 18 (T5) | | 109 | 60 | 1.5 |

On April 3rd, 50 test bee hives were didived inton 10 groups of 5 randomly taken. The chemical shock needed to obtain the number of *Varroa* mites not controlled by the treatment was done 42 days later with amitraz. To evaluate efficacy grid floors were used, which allowed counting dead mites during the treatment and after the chemical shock with amitraz treatment. Efficacy was calculated as the quotient of the number of falling mites before the chemical shock and the total number.

TABLE 2

Working schedule

| April 3 | Place grid floor. Place treatment |
| April 10 | Count mites |
| April 17 | Count mites |
| April 24 | Count mites |
| May 1 | Count mites |
| May 8 | Count mites |
| May 15 | Count mites Remove treatment Place chemical shock |

TABLE 2-continued

Working schedule

| June 19 | Count mites Remove chemical shock Remove grid floors |

Results and Conclusions

At first, no significant differences were found regarding treatments with thicknesses of 1.5 mm and those of 3 mm. The incidence of cellulose thickness on the practicality of the application was irrelevant, since the only difference found was a greater flabbiness for the thinner cellulose which in some cases bent.

Figure 4:
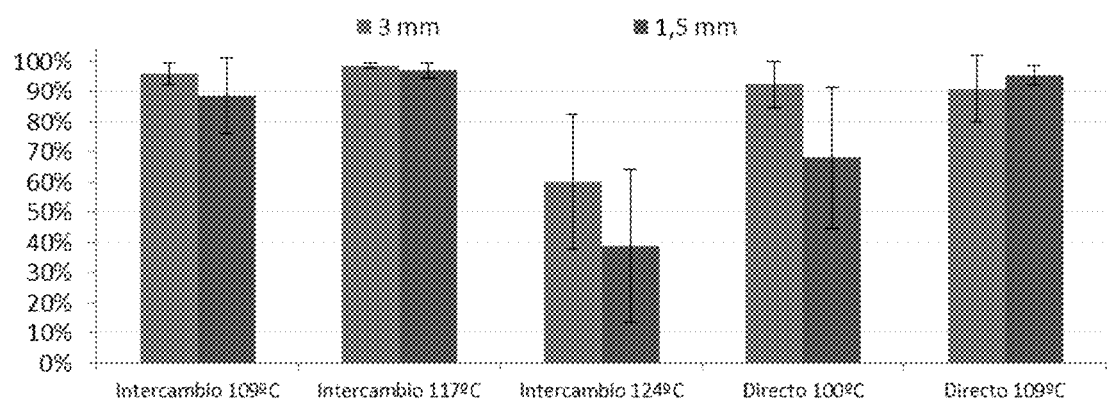
FIG. 4: Influence of cellulose thickness and temperature, time and manner of heating of the solution on the efficacy of the treatments evaluated.

FIG. 4 it can be observed that the larger width of the cellulose increases the efficacy in treatments and in turn decreases variability. On the other hand, in the treatments applied by heat exchanger there is a significant decrease of product efficacy for being manufactured at temperatures higher than 120° C. for longer than 30 minutes (Oxa 13 and Oxa 14). In turn, it is concluded that treatments applied by exchanger at lower temperatures are more efficient and show a lower variability than with direct heating.

Example 6

Pharmacodynamic analysis of the composition of the present invention. Determination of the efficacy and residuality of the miticide composition of the present invention to be applied to bee colonies with constant brood cycle.

Efficacy and residue levels were determined in different hive matrices (honey, wax and bees) generated by the application of the miticide composition of the present invention. In order to do so, a field study was performed during Autumn 2013 (March-April) using 24 bee hives divided in two groups, one of 7 units (bee hives without treatment, control group) and the other of 17 (bee hives which received the composition of the present invention in cellulose strips of the present invention). Prior to the tests, colonies were stabilized in populations of bees and reserves. Samples were taken from the three matrices in 14 bee hives (7 from each group, randomly) at two different moments: before placing the treatment and just after memoving it. Also, mite mortality caused by the treatment at days 7, 14, 28, 35 and 42 was monitored. On removing the miticide strips of the present invention from the bee hives, a shock treatment with Amivar500® was performed. Dosing Amivar500® was conducted according to specifications given on the label of the commercial product. The population of adult bees and brood was quantified before and after the miticide treatment so as to evaluate the impact of the drug on the population status of the colonies. Thus, the efficacy of the new miticide composition of the invention and the potential variation of the oxalic acid residues generated by said composition at different monitored times was evaluated.

Efficacy Testing

Tabla 3 shows the number of fallen mites for each monitoring time (days 7, 14, 28, 35 and 42) in bee hives which had received miticide treatment of the present invention and in bee hives without treatment.

Table 3 shows the number of fallen mites for each monitoring time (days 7, 14, 28, 35 and 42) in bee hives which had received miticide treatment of the present invention and in bee hives without treatment.

| Test | Treatment | Bee hive | Number of fallen mites per day: | | | | | Total | Number of mites fallen on shock treatment | Efficacy of the formulation (%) |
|---|---|---|---|---|---|---|---|---|---|---|
| | | | 7 | 14 | 28 | 35 | 42 | | | |
| Apiary: Mar del Plata 2013 | Formulation | 1 | 34 | 48 | 27 | 1 | 0 | 110 | 9 | 92.4 |
| | | 2 | 120 | 106 | 24 | 1 | 0 | 251 | 21 | 92.3 |
| | | 3 | 56 | 214 | 56 | 0 | 2 | 328 | 13 | 96.2 |
| | | 4 | 12 | 47 | 22 | 2 | 0 | 83 | 1 | 98.8 |
| | | 5 | 87 | 119 | 17 | 1 | 1 | 225 | 42 | 84.3 |
| | | 6 | 20 | 42 | 2 | 1 | 4 | 69 | 3 | 95.8 |
| | | 7 | 41 | 12 | 9 | 0 | 0 | 62 | 7 | 89.8 |
| | | 8 | 54 | 185 | 144 | 4 | 15 | 402 | 21 | 95.1 |
| | | 9 | 0 | 282 | 46 | 14 | 0 | 342 | 14 | 96.1 |
| | | 10 | 48 | 655 | 565 | 45 | 3 | 1316 | 16 | 98.8 |
| | | 11 | 19 | 186 | 112 | 18 | 3 | 338 | 1 | 99.7 |
| | | 12 | 267 | 50 | 49 | 0 | 5 | 373 | 15 | 96.1 |
| | | 13 | 100 | 815 | 348 | 41 | 1 | 1305 | 0 | 100 |
| | | 14 | 88 | 560 | 400 | 815 | 253 | 2116 | 70 | 96.8 |
| | | 15 | 42 | 72 | 63 | 3 | 2 | 182 | 20 | 90.1 |
| | | 16 | 26 | 10 | 33 | 1 | 3 | 73 | 23 | 76 |
| | | 17 | 49 | 70 | 49 | 15 | 12 | 189 | 18 | 91.3 |

Population Analysis of the Colonies Treated

Tabla 4 provides information on the boxes covered with adult bees and brood before and after the end of the miticide treatment. Observing the corresponding table it can be noticed that the miticide treatment of the present invention does not show negative effects on bee colonies.

TABLE 4

Boxes covered with adult bees and brood before and after applying the formulation with oxalic acid.

| | Before treatment | After treatment | |
|---|---|---|---|
| Treated | 8.7 (1.2) | 8 (0.5) | Number of boxes covered with adult bees |
| Untreated | 9 (0.44) | 8.6 (0.2) | |
| Treated | 4.6 (0.8) | 3.2 (0.44) | Number of boxes with brood |
| untreated | 4.7 (0.3) | 3.1 (0.33) | |

Residue Analysis

The physico-chemical analysis of the product by GC-FID (Fares Taie Clinical Analysis Laboratory) allowed a satisfactory evaluation of residues generated by the application of the present invention on completion of the treatment (day 42). Analysis show that said formulation does not generate oxalic acid residues in the different matrices of the bee hives analyzed at the end of the treatment. Tables 5 and 6 show the results of residues detected in the course of the test for the matrices of honey and wax, respectively. As it can be seen in Table 5, in general, all bee hives (treated or untreated) increased their level of oxalic acid at the end of the treatment, which shows that the increase in honey of the active principle is due to external sources (flowers) and not to the present invention.

TABLE 5

Residues of oxalic acid (mg/kg) detected in honey before (day 0) and after (day 42) applying the miticide treatment of the invention. Detection limit: 0.5 mg/kg. Quantification limit 1 mg/kg

| Group | Before treatment | On treatment completion |
|---|---|---|
| Treated 1 | 16.2 | 0 |
| Treated 2 | 8.2 | 9.21 |

TABLE 5-continued

| Group | Before treatment | On treatment completion |
|---|---|---|
| Treated 3 | 3.2 | 9.9 |
| Treated 4 | 4.4 | 35.37 |
| Treated 5 | 12.9 | 26.65 |
| Treated 6 | 2.7 | 7.66 |
| Treated 7 | 5.2 | 28.47 |
| Untreated 8 | 10.2 | 0 |
| Untreated 9 | 17.1 | 14.39 |
| Untreated 10 | 0 | 10.68 |
| Untreated 11 | 2.5 | 16.21 |
| Untreated 12 | 13.6 | 33.91 |
| Untreated 13 | 33.8 | 44.61 |
| Untreated 14 | — | — |

Residues of oxalic acid (mg/kg) detected in honey before (day 0) and after (day 42) applying the miticide treatment of the invention. Detection limit: 1.5 mg/kg. Quantification limit 12 mg/kg

| Tratada 1 | 0 | 0 |
| Tratada 2 | 0 | 0 |
| Tratada 3 | 0 | 0 |
| Treated 4 | 0 | 0 |
| Treated 5 | 0 | 0 |
| Treated 6 | 0 | 0 |
| Treated 7 | 0 | 0 |
| Untreated 8 | 0 | 0 |
| Untreated 9 | 0 | 0 |
| Untreated 10 | 0 | 0 |
| Untreated 11 | 0 | 0 |
| Untreated 12 | 0 | 0 |
| Untreated 13 | 0 | 0 |
| Untreated 14 | 0 | 0 |

CONCLUSIONS

By the end of the miticide treatment no harm was observed in the colonies. The miticide treatment does not generate oxalic acid residues in honey, wax or in bees. The increase in oxalic acid observed on completion of the treatment is due to floral sources from which nectar is obtained to manufacture honey.

The miticide composition is efficient in colonies with bee brood.

The invention claimed is:

1. A process to manufacture an impregnated cellulose miticide strip comprising a composition of prolonged action against *Varroa destructor* in bee hives, said process comprising the following steps:
   a. mixing glycerin in a concentration of between 50 and 75% (V/V) and oxalic acid in a concentration of between 25 and 50% (V/V), providing a mixture,
   b. heating the mixture up to a temperature ranging from more than 100° C. to 130° C., and stirring the mixture, and as a result obtaining a miticide composition comprising glycerin between 0 and 20% (W/W); oxalic acid between 5 and 20% (W/W), formic acid between 0.5 and 15% (W/W) and tartaric acid in a concentration of at least 50% (W/W),
   c. cooling the mixture, and
   d. dipping at least one cellulose strip in said miticide composition impregnating the cellulose strip,
wherein said impregnated cellulose strip acts by contact in said bee hives.

2. The process according to claim 1, wherein step b. comprises heating up to a temperature ranging from 100° C. to 130° C. during a period of time ranging from 1 to 5000 seconds.

3. The process according to claim 1, wherein step b. comprises heating up to a temperature ranging from 100° C. to 120° C. during a period of time ranging from 1 to 120 seconds.

4. The process according to claim 1, wherein step b. comprises a continuous process and heating by means of a continuous flow heat exchanger, up to a temperature ranging from 100° C. to 130° C. during a period of time ranging between 1 and 60 seconds.

5. The process according to claim 1, wherein step a. comprises mixing the glycerin and oxalic acid at a ratio from 1:3 to 3:1, and step b. comprises heating up to a temperature ranging from 100° C. to 130° C. during a period of time ranging from 1 to 5000 seconds.

6. A process to manufacture an impregnated cellulose miticide strip comprising a composition of prolonged action against *Varroa destructor* in bee hives, said process comprising the following steps:
   a. mixing glycerin in a concentration of between 50 and 75% (V/V) and oxalic acid in a concentration of between 25 and 50% (V/V), providing a mixture,
   b. heating the mixture up to a temperature ranging from more than 100° C. to 130° C. during a period ranging from 1 to 600 seconds, and stirring the mixture, and as a result obtaining a miticide composition comprising glycerin between 0 and 20% (W/W); oxalic acid between 5 and 20% (W/W), formic acid between 0.5 and 15% (W/W) and tartaric acid in a concentration of at least 50% (W/W),
   c. cooling the mixture, and
   d. dipping at least one cellulose strip in said miticide composition impregnating the cellulose strip,
wherein said impregnated cellulose strip acts by contact in said bee hives.

* * * * *